United States Patent
Nagase

(10) Patent No.: US 10,486,472 B2
(45) Date of Patent: Nov. 26, 2019

(54) PNEUMATIC TIRE

(71) Applicant: Sumitomo Rubber Industries, Ltd., Kobe-shi, Hyogo (JP)

(72) Inventor: Masahiro Nagase, Kobe (JP)

(73) Assignee: SUMITOMO RUBBER INDUSTRIES, LTD., Kobe-shi, Hyogo (JP)

(*) Notice: Subject to any disclaimer, the term of this patent is extended or adjusted under 35 U.S.C. 154(b) by 377 days.

(21) Appl. No.: 15/462,380

(22) Filed: Mar. 17, 2017

(65) Prior Publication Data

US 2017/0267029 A1 Sep. 21, 2017

(30) Foreign Application Priority Data

Mar. 18, 2016 (JP) .................................. 2016-055868

(51) Int. Cl.
| | | |
|---|---|---|
| *B60C 11/03* | (2006.01) | |
| *B60C 11/04* | (2006.01) | |
| *B60C 11/12* | (2006.01) | |
| *B60C 11/13* | (2006.01) | |

(52) U.S. Cl.
CPC ...... *B60C 11/0302* (2013.01); *B60C 11/0304* (2013.01); *B60C 11/0306* (2013.01); *B60C 11/04* (2013.01); *B60C 11/1204* (2013.01); *B60C 11/125* (2013.01); *B60C 11/1263* (2013.01); *B60C 11/1369* (2013.01); *B60C 2011/0344* (2013.01); *B60C 2011/0353* (2013.01); *B60C 2011/0355* (2013.01); (Continued)

(58) Field of Classification Search
CPC ... B60C 11/302; B60C 11/304; B60C 11/306; B60C 11/04; B60C 11/1204; B60C 11/125; B60C 11/1263; B60C 11/1369
See application file for complete search history.

(56) References Cited

U.S. PATENT DOCUMENTS

2013/0112325 A1* 5/2013 Mukai ................. B60C 11/1369
152/209.8
2015/0210121 A1* 7/2015 Sanae ................. B60C 11/0304
152/209.8

FOREIGN PATENT DOCUMENTS

DE 102010060933 A1 * 6/2012 ......... B60C 11/1263
JP 6-32115 A 2/1994
(Continued)

OTHER PUBLICATIONS

Extended European Search Report, dated Jul. 28, 2017, for European Application No. 17161070.2.

*Primary Examiner* — Jodi C Franklin
*Assistant Examiner* — Farah Taufiq
(74) *Attorney, Agent, or Firm* — Birch, Stewart, Kolasch & Birch, LLP

(57) ABSTRACT

A pneumatic tire whose position when mounted on a vehicle is specified so that the tread portion 2 has an outside tread edge Te1 and an inside tread edge Te2. The tread portion 2 comprises an outside land region 4A provided with first sipes 10 extending across the entire width of the outside land region. The first sipe 10 comprises a v-shaped portion 13 formed by a first oblique segment 11 and a second oblique segment 12. The v-shaped portion 13 has an apex 15 located on the outside-tread-edge side of a widthwise center of the outside land region 4A. The maximum depth d2 in the second oblique segment 12 is smaller than the maximum depth d1 in the first oblique segment 11.

17 Claims, 6 Drawing Sheets

(52) U.S. Cl.
CPC ............... *B60C 2011/1209* (2013.01); *B60C 2011/1213* (2013.01)

(56) References Cited

FOREIGN PATENT DOCUMENTS

JP 2014-210499 A 11/2014
WO WO 2012/093000 A1 7/2012

* cited by examiner

PNEUMATIC TIRE

TECHNICAL FIELD

The present invention relates to a pneumatic tire, more particularly to a tread pattern capable of improving steering stability.

BACKGROUND ART

Japanese Patent Application Publication No. 2014-210499 (Patent Literature 1) discloses a pneumatic tire having a tread portion whose position when mounted on a vehicle is specified so that the tread portion has outside land regions on the outside-tread-edge side of the tire equator. Of the outside land regions, the axially inner outside land region is provided with v-shaped sipes extending across the entire width of the outside land region, wherein the v-shaped sipe is made up of a first oblique segment and a second oblique segment which are inclined to opposite directions with respect to the tire axial direction. In the v-shaped sipe disclosed in Patent Literature 1, the apex of the v-shape, namely, the intersecting point of the first and second oblique segments is positioned on the tire-equator side or the axially inside of the widthwise center of this outside land region.

Such arrangement of the apexes of the v-shaped sipes tends to decrease the rigidity of the outside land region more in an outside-tread-edge side than in a tire-equator side. Thereby, in the pneumatic tire of Patent Literature 1, a part of the outside land region on the outside-tread-edge side tends to deform easily during cornering, for example. Thus, there is room for further improvement in the steering stability.

SUMMARY OF THE INVENTION

The present invention was made in view of the above, and a primary object of the present invention is to provide a pneumatic tire, in which the steering stability can be improved.

According to the present invention, a pneumatic tire comprises a tread portion whose position when mounted on a vehicle is specified so that the tread portion has an outside tread edge located toward the outside of the vehicle and an inside tread edge located toward the inside of the vehicle, the tread portion provided with an outside land region disposed on the outside-tread-edge side of the tire equator, the outside land region provided with first sipes each extending across the entire width of the outside land region and each comprising a v-shaped portion, wherein the v-shaped portion is formed by a first oblique segment and a second oblique segment connected with each other at an apex of the v-shaped portion, the apex is located on the outside-tread-edge side of a widthwise center of the outside land region, the first oblique segment and the second oblique segment are on the inside-tread-edge side and the outside-tread-edge side of the apex, respectively, and the first oblique segment has a maximum depth and the second oblique segment has a maximum depth smaller than the maximum depth of the first oblique segment.

In the pneumatic tire according to the present invention, it is preferred that each of the first sipes is provided with a transitional portion in which the depth of the first sipe is changed and which is positioned so as not to include the apex.

In the pneumatic tire according to the present invention, it is preferred that the transitional portion is positioned on the inside-tread-edge side of the apex.

In the pneumatic tire according to the present invention, it is preferred that the depth of the first oblique segment measured at its end portion on the inside-tread-edge side, is smaller than the above-said maximum depth of the first oblique segment.

In the pneumatic tire according to the present invention, it is preferred that the tread portion is provided on the inside-tread-edge side of the tire equator with an inside land region, the inside land region is provided with second sipes each extending straight across the entire width of the inside land region, and the second sipes are inclined to the same direction as the first oblique segments of the first sipes.

In the pneumatic tire according to the present invention, it is preferred that the second sipes have their ends on the inside-tread-edge side which are respectively connected with wider slot-like depressions formed at the edge on the inside-tread-edge side, of the inside land region.

In the pneumatic tire according to the present invention, it is preferred that each of the second sipes comprises a first portion in which the maximum depth of the second sipe occurs, a second portion which is disposed on the outside-tread-edge side of the first portion, and of which maximum depth is smaller than the above-said maximum depth in the first portion, and a third portion which is disposed on the inside-tread-edge side of the first portion and of which maximum depth is smaller than the above-said maximum depth in the first portion, and the second portion has an axial dimension and the third portion has an axial dimension smaller than the axial dimension of the second portion.

In the pneumatic tire according to the present invention, it is preferred that in the above-said first portion, the depth of the second sipe is gradually decreased toward the inside tread edge.

In the pneumatic tire according to the present invention, it is preferred that the second oblique segment of the above-said v-shaped portion has a flat bottom extending at a constant depth.

In the pneumatic tire according to the present invention, it is preferred that an angle of the above-said first oblique segment with respect to the tire axial direction is not less than 25 degrees and not greater than 35 degrees, an angle of the above-said second oblique segment with respect to the tire axial direction is not less than 5 degrees and not greater than 15 degrees, and an angle between the first oblique segment and the second oblique segment is not less than 130 degrees and not greater than 150 degrees.

In the pneumatic tire according to the present invention, it is preferred that the tread portion is provided with circumferentially continuously extending main grooves including a center main groove, an outside shoulder main groove on the outside tread edge side of the center main groove, and an inside shoulder main groove on the inside tread edge side of the center main groove, and a groove width of each of the main grooves is not less than 3.5% and not greater than 10.0% of a tread width between the outside tread edge and the inside tread edge.

In the pneumatic tire according to the present invention, it is preferred that the total of the groove widths of the main grooves is not less than 23% of the tread width.

In the pneumatic tire according to the present invention, it is preferred that the groove width of the center main groove is larger than the groove width of the shoulder main groove.

In the pneumatic tire according to the present invention, it is preferred that a groove depth of each of the main groove is not less than 5.0 mm and not greater than 12.0 mm.

In the pneumatic tire according to the present invention, it is preferred that the tread portion comprises an outside shoulder land region between the outside shoulder main groove and the outside tread edge, and an outside middle land region between the outside shoulder main groove and the center main groove, the outside middle land region is the above-said outside land region provided with the first sipes.

The outside shoulder land region may be provided with first outside shoulder transverse grooves each extending from the outside tread edge to the outside shoulder main groove and each provided in its axially inner end portion with a siped tie bar rising from the groove bottom.

Further, the outside shoulder land region may be provided with second outside shoulder transverse grooves alternately with the first outside shoulder transverse grooves, the outside shoulder land region is further provided with a first outside shoulder vertical groove extending from each of the first outside shoulder transverse grooves to one of the two circumferentially adjacent second outside shoulder transverse grooves, and a second outside shoulder vertical groove extending from the above-said each of the first outside shoulder transverse grooves toward the other of the above-said two circumferentially adjacent second outside shoulder transverse grooves, and terminated within the outside shoulder land region.

Therefore, in the pneumatic tire according to the present invention, by the provision of the first sipes, distortion of the ground contacting surface of the outside land region is suppressed, and uneven wear of the outside land region can be suppressed.

Since the first sipe includes the v-shaped portion, when the outside land region is applied by a ground contacting pressure or lateral force, the opposite sidewalls of the first sipe contact firmly with each other, and an apparent rigidity of the outside land region is increased. As a result, the steering stability can be improved.

When the opposite sidewalls firmly contact with each other, the outside land region shows a relatively high apparent rigidity around the apexes of the v-shaped portions. Therefore, by disposing the apexes on the outside-tread-edge side of the widthwise center of the outside land region, the apparent rigidity of a part on the outside-tread-edge side of the outside land region can be effectively increased.

Further, as the maximum depth in the second oblique segment on the outside-tread-edge side is set to be smaller than the maximum depth in the first oblique segment on the inside-tread-edge side, the apparent rigidity of the part on the outside-tread-edge side of the outside land region can be further increased. Therefore, deformation of the outside middle land region during cornering is suppressed, and the steering stability is improved.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

The tread edges Te (Te1, Te2) are the axial outermost edges of the ground contacting patch of the tire which occurs under the normally inflated loaded condition when the camber angle of the tire is zero.

The tread width TW is the width measured under the normally inflated unloaded condition, as the axial distance between the tread edges determined as above.

The term "sipe" means a narrow groove having a width not greater than 1.5 mm inclusive of a cut having no substantial width, and the term "groove" means that having a width greater than 1.5 mm.

DESCRIPTION OF THE PREFERRED EMBODIMENTS

The present invention can be applied to various pneumatic tires, and suitably applied to passenger car tires.

Taking a pneumatic tire for passenger cars as an example, embodiments of the present invention will now be described in detail in conjunction with accompanying drawings.

As well known in the art, a pneumatic tire comprises a tread portion 2 whose radially outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion.

Figure 1:
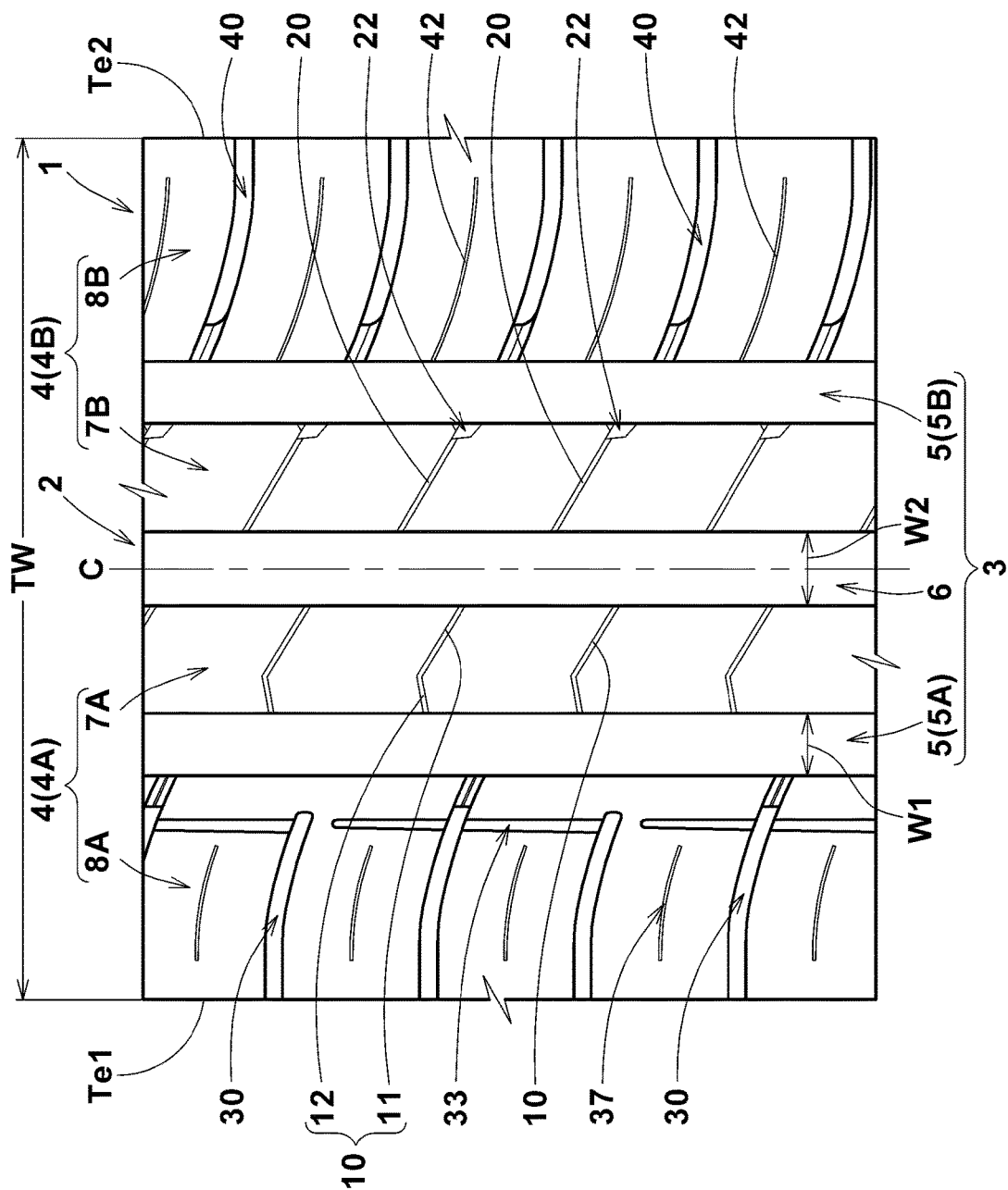
FIG. 1 is a developed partial view of the tread portion of a pneumatic tire as an embodiment of the present invention.

FIG. 1 shows a part of the tread portion 2 of a pneumatic tire 1 as an embodiment of the present invention.

In this embodiment, the tread portion 2 is provided with a tread pattern asymmetrical about the tire equator C, and the mounting position of the tire (the inside and outside of the tire) when the tire is mounted on a vehicle is specified so that the tread portion 2 has an outside tread edge Te1 to be positioned away from the center of the vehicle body and an inside tread edge Te2 to be positioned close to the center of the vehicle body.

The intended mounting position is indicated in the sidewall portion and the like of the tire 1 by characters, marks and/or the like. For example, the sidewall portion to be located on outside is provided with an indication such as "outside", and the sidewall portion to be located on inside is provided with an indication such as "inside".

In FIG. 1, the left side is located toward the outside of the vehicle and the right side is located toward the inside of the vehicle when the tire 1 is mounted on a vehicle.

The tread portion 2 is provided with a plurality of main grooves 3 extending continuously in the tire circumferential direction, and a plurality of land regions 4 axially divided by the main grooves 3.

Each of the main grooves 3 may extend straight, zigzag or wavy in the tire circumferential direction. But, in this embodiment, each of the main grooves 3 is a straight groove.

The main grooves 3 include a shoulder main groove 5 on the outside or inside tread edge side, and a center main groove 6 on the tire equator side of the shoulder main groove 5.

In this embodiment, the main grooves 3 are a single center main groove 6, and two shoulder main grooves 5 as axially outermost main grooves on the outside-tread-edge side and the inside-tread-edge side of the center main groove 6.

The two shoulder main grooves 5 are an outside shoulder main groove 5A on the outside-tread-edge side, and an inside shoulder main groove 5B on the inside-tread-edge side.

In this embodiment, the center main groove 6 between the shoulder main grooves 5A and 5B is disposed on the tire equator C. But, in another embodiment, the center main groove 6 can be disposed on each side of the tire equator C.

The total of the groove widths of the main grooves 3 is preferably set to be not less than 23% of the tread width TW in order to secure the wet performance for example.

In this embodiment, the groove widths W1 of the shoulder main grooves 5A and 5B and the groove width W2 of the center main groove 6 are preferably set in a range from 3.5% to 10.0% of the tread width TW.

The groove depths of the shoulder main grooves 5 and the groove depth of the center main groove 6 are preferably set in a range from 5.0 to 12.0 mm for a pneumatic tire for passenger cars as in this embodiment.

In this embodiment, it is preferable that the groove width of the center main groove 6 is set to be larger than the groove width of the inside shoulder main groove 5B in order to expedite drainage from the tread crown portion and thereby to improve the aquaplaning resistance of the tire.

The land regions 4 are divided as outside land regions 4A on the outside-tread-edge side of the tire equator C, and inside land regions 4B on the inside-tread-edge side of the tire equator C. The outside land regions 4A are divided by the outside shoulder main groove 5A as an outside middle land region 7A between the outside shoulder main groove 5A and the center main groove 6, and an outside shoulder land region 8A between the outside shoulder main groove 5A and the outside tread edge Te1.

The inside land regions 4B are divided by the inside shoulder main groove 5B as an inside middle land region 7B between the inside shoulder main groove 5B and the center main groove 6, and an inside shoulder land region 8B between the inside shoulder main groove 5B and the inside tread edge Te2.

In this embodiment, the width W3 of each of the outside and inside middle land regions 7A and 7B is set in a range from 0.10 to 0.20 times the tread width TW.

Further, in this embodiment, each of the outside and inside middle land regions 7A and 7B is provided with no transverse groove having a width greater than 1.5 mm and extending across the entire width of the concerned land region, therefore, the land region 7A, 7B is formed as a substantially continuously extending rib.

However, the outside middle land region 7A is provided with first sipes 10 extending across the entire width of the outside middle land region 7A in order to suppress the distortion of the ground contacting surface of the outside middle land region 7A and thereby to suppress uneven wear of the outside middle land region 7A.

The first sipe 10 comprises a v-shaped portion 13 made up of a first oblique segment 11 on the inside-tread-edge side (right side in FIG. 2) and a second oblique segment 12 on the outside-tread-edge side (left side in FIG. 2) which are connected with each other at the apex 15 of the v-shaped portion. The first oblique segment 11 and the second oblique segment 12 are inclined with respect to the tire axial direction to opposite directions to each other.

In the first sipe 10 having the v-shaped portion 13 like this, its opposite sidewalls contact firmly with each other when the ground contacting pressure or lateral force is applied to the land region. Thereby, an apparent rigidity of the outside land region is increased, and the steering stability is improved. When the opposite sidewalls firmly contact with each other, a part of the outside middle land region 7A around the apex 15 of the v-shaped portion 13 shows relatively high rigidity.

Therefore, according to the present invention, the apex 15 of the v-shaped portion 13 of each of the first sipes 10 is disposed on the outside-tread-edge side of the widthwise center line 14 of the outside middle land region 7A. As a result, the rigidity of the outside middle land region 7A is effectively increased in its part on the outside-tread-edge side.

FIG. 3(*a*) shows the depth of the first sipe 10. As shown, the maximum depth d2 in the second oblique segment 12 is set to be smaller than the maximum depth d1 in the first oblique segment 11. Therefore, the apparent rigidity of the outside middle land region 7A is further increased in the part on the outside-tread-edge side of the apexes 15. As a result, deformation of the outside middle land region 7A during cornering is suppressed, and excellent steering stability can be obtained.

If the first oblique segment 11 and the second oblique segment 12 have the same maximum depth, the outside middle land region 7A has substantially uniform rigidity in the width direction thereof when the sidewalls firmly contact with each other. In this case, the rigidity of the outside middle land region 7A tends to become insufficient in its part on the outside-tread-edge side during cornering.

The maximum depth d2 in the second oblique segment 12 is preferably not less than 0.30 times, more preferably not less than 0.40 times, and preferably not greater than 0.60 times, more preferably not greater than 0.50 times the maximum depth d1 in the first oblique segment 11. More specifically, it is preferred that the maximum depth d2 in the second oblique segment 12 is 2.0 to 3.0 mm, for example. Thereby, it is possible to maintain the rigidity of the outside middle land region 7A, and the distortion of the ground contacting surface of the outside middle land region 7A is suppressed.

Figure 3A:
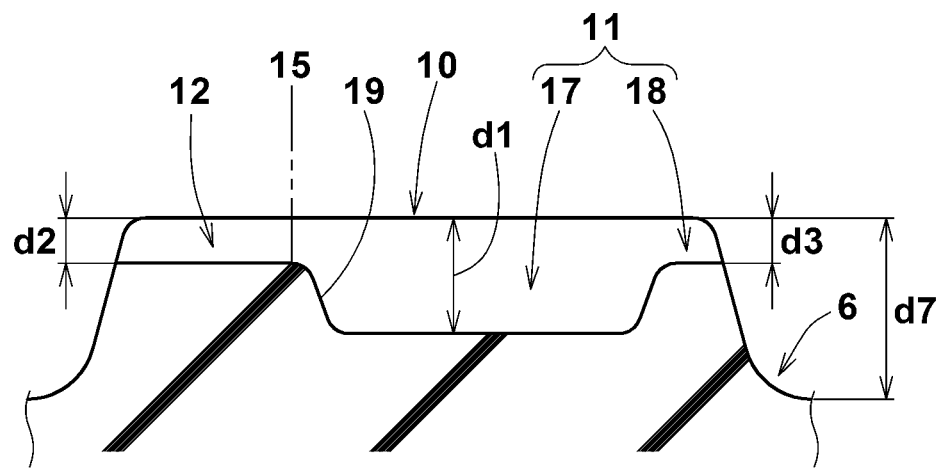
FIG. 3(a) is a cross-sectional view taken along line A-A in FIG. 2.

The second oblique segment 12 may have a variable depth. But, in this example, as shown in FIG. 3(a), the second oblique segment 12 has a constant depth to have a flat bottom extending in its longitudinal direction at the above-mentioned maximum depth d2.

The maximum depth d1 in the first oblique segment 11 is set in a range from 0.50 to 0.70 times the groove depth d7 of the center main groove 6, for example.

In this embodiment, the first oblique segment 11 is composed of a main portion 17 extending in its longitudinal direction with the maximum depth d1 in a range from 5.0 to 6.0 mm, and an end portion 18 on the inside-tread-edge side of the main portion, having a depth d3 smaller than the maximum depth d1.

Such first oblique segments 11 maintain the rigidity in the tire circumferential direction of the outside middle land region 7A to exert excellent steering stability.

The depth d3 of the end portion 18 of the first oblique segment 11 is preferably set in a range from 0.30 to 0.60 times the maximum depth d1 in the first oblique segment 11.

In this embodiment, the depth d3 of the end portion 18 is the same as the depth of the second oblique segment 12, namely, the above-mentioned maximum depth d2. Thereby, uneven wear of the outside middle land region 7A can be suppressed.

The first sipe 10 includes a transitional portion 19 within which the depth of the first sipe 10 is changed. The transitional portion 19 is disposed in a different position from that of the apex 15. In other words, the apex 15 is not included in the extent in the sipe's longitudinal direction of the transitional portion 19.

There is a possibility that flexion deformation of the first sipe 10 is induced by the v-shaped portion, starting from the apex 15. However, in this embodiment, excessive stress concentration to the apex 15 due to the flexion deformation can be prevented since the apex 15 and the transitional portion 19 are disposed at different positions from each other.

Preferably, the transitional portion 19 is disposed on the inside-tread-edge side of the apex 15. Thereby, the rigidity of the outside middle land region around the apex 15 is maintained at a higher level.

Figure 2:
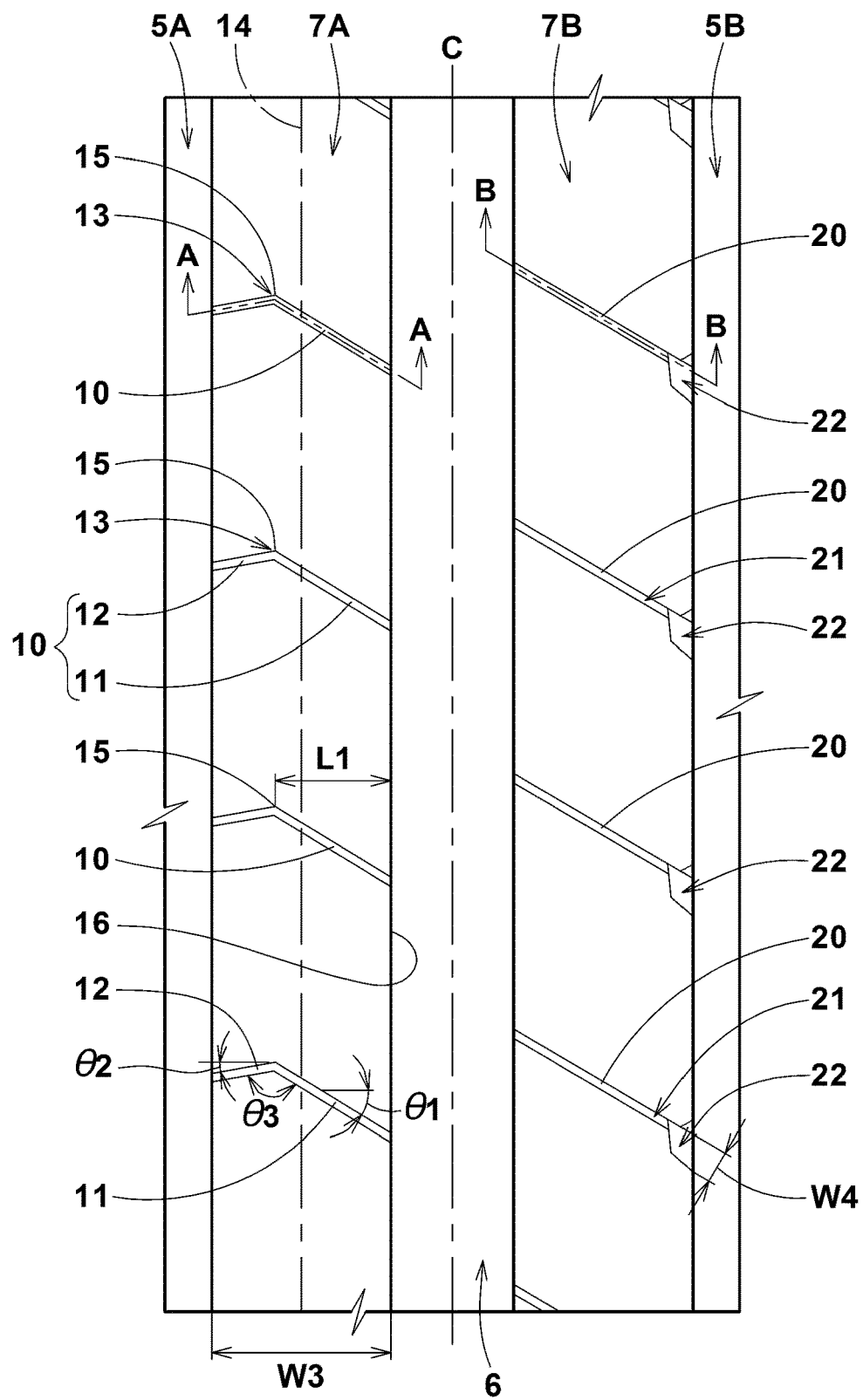
FIG. 2 is a magnified partial view of an outside middle land region and an inside middle land region in FIG. 1.

Preferably, the first oblique segments 11 are inclined with respect to the tire axial direction as shown in FIG. 2, for example, at an angle θ1 in a range from 25 to 35 degrees. Preferably, the second oblique segments 12 are inclined with respect to the tire axial direction as shown in FIG. 2, for example, at an angle θ2 in a range from 5 to 15 degrees. Preferably, the angle θ3 between the first oblique segment 11 and the second oblique segment 12 of each first sipe 10 is set in a range from 130 to 150 degrees, for example. Such first sipes 10 can satisfy both the steering stability and the wet performance in a good balance.

It is preferable that the axial distance L1 of the apex 15 from the edge 16 on the tire-equator-C side, of the outside middle land region 7A is set in a range from 0.60 to 0.75 times the axial width W3 of the outside middle land region 7A. Thereby, the position of the apex 15 is optimized, and it is possible that the above-described effects are obtained while suppressing wear of the outside middle land region around the apexes 15.

In this embodiment, the first sipes comprising the V-shaped portions are provided in the outside middle land region. But, according to the present invention, such first sipes may be provided in the outside shoulder land region.

In this embodiment, the inside middle land region 7B is provided with second sipes 20 extending across the entire width of the inside middle land region 7B. The second sipes 20 extend straight and are inclined in the same direction as the first oblique segments 11 of the first sipes 10. Such second sipes 20 can make progress of wear uniform in the outside middle land region 7A and the inside middle land region 7B.

In this embodiment, the inside middle land region 7B is provided at its edge on the inside-tread-edge side with slot-like depressions 22. Accordingly, the axial width of the inside middle land region 7B is periodically decreased at the circumferential positions of the slot-like depressions 22. Preferably, end portions 21 on the inside-tread-edge side, of the second sipes 20 are connected with the slot-like depressions 22 to open thereat. The slot-like depression 22 has a width W4 greater than the width of the second sipe 20, for example, in a range from 3.5 to 6.5 mm. Such second sipes 20 and slot-like depressions 22 can improve the wet performance effectively.

Figure 3B:
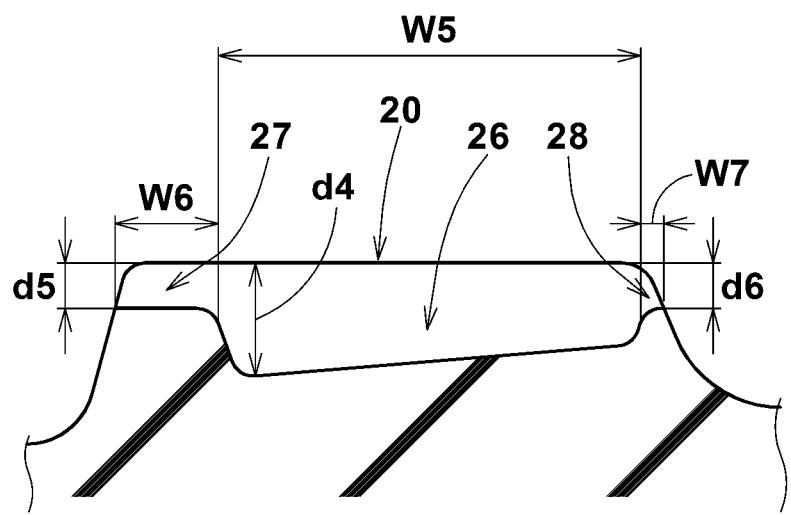
FIG. 3(b) is a cross-sectional view taken along line B-B in FIG. 2.

FIG. 3(b) shows the depth of the second sipe 20. As shown, the second sipe 20 in this embodiment comprises a first portion 26 in which the maximum depth d4 of the second sipe 20 occurs, and a second portion 27 and a third portion 28 on both sides of the first portion 26.

It is preferred that the maximum depth d4 in the first portion 26 is 4.0 to 6.0 mm, for example.

In this embodiment, the maximum depth d4 in the first portion 26 is set to be the same as the maximum depth d1 of the first sipe 10 in order to allow the outside middle land region 7A and the inside middle land region 7B to wear uniformly.

It is preferable that the sipe depth in the first portion 26 in this embodiment is gradually decreased toward the inside tread edge Te2. Such first portions 26 can smoothly change the rigidity of the inside middle land region 7B toward the inside tread edge Te2.

The second portion 27 is formed on the outside-tread-edge side of the first portion 26.

In this embodiment, the maximum depth d5 in the second portion 27 is smaller than the maximum depth d4 in the first portion 26. It is preferred that the maximum depth d5 in the second portion 27 is 0.30 to 0.60 times the maximum depth d4 of the first portion 26. Thereby, the inside middle land region 7B is increased in the rigidity on the outside-tread-edge side, therefore, excellent steering stability is exerted.

As shown in FIG. 3(a), the first portion 26 has an axial dimension W5. The second portion 27 has an axial dimension W6 smaller than the axial dimension W5. Preferably, the dimension W6 is set in a range from 0.15 to 0.25 times the dimension W5. For example, the dimension W6 is set in a range from 2.5 to 4.0 mm.

The third portion 28 is formed on the inside-tread-edge side of the first portion 26.

In this embodiment, the maximum depth d6 in the third portion 28 is smaller than the maximum depth d4 in the first portion 26. For example, the maximum depth d6 in the third portion 28 is the same as the maximum depth d5 of the second portion 27.

It is preferable that the axial dimension W7 of the third portion 28 is smaller than the axial dimension w6 of the second portion 27. For example, the dimension W7 is 0.25 to 0.35 times the dimension W6. Such third portions 28 moderately decrease the rigidity of the inside middle land region 7B on the inside-tread-edge side to improve the ride comfort.

In this embodiment, the second sipes extending straight are provided in the inside middle land region. But, according to the present invention, the second sipes may be provided in the inside shoulder land region.

Figure 4:
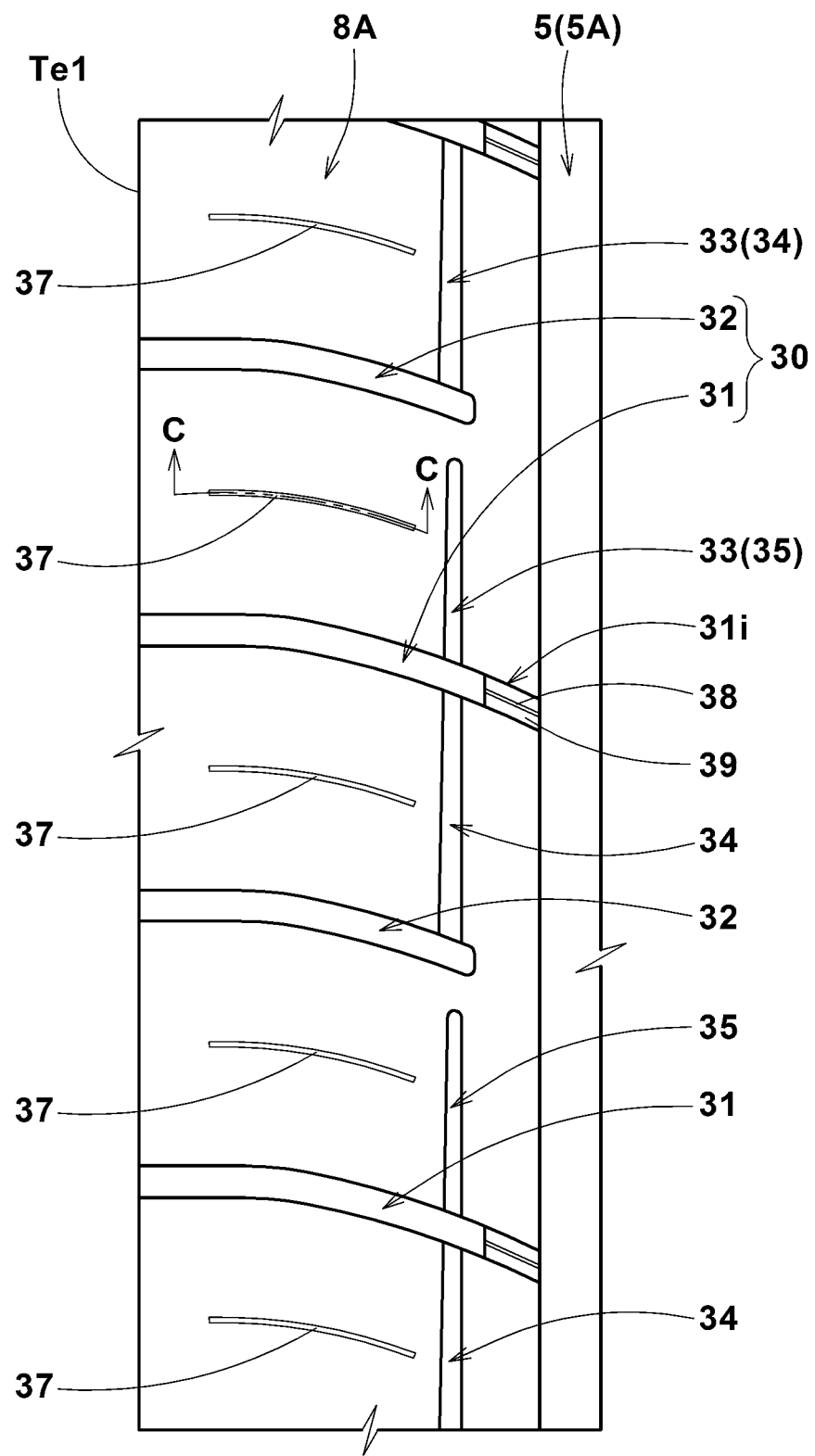
FIG. 4 is a magnified partial view of an inside shoulder land region in FIG. 1.

In this embodiment, as shown in FIG. 4, the outside shoulder land region 8A is provided with outside shoulder transverse grooves 30, outside shoulder vertical grooves 33, and outside shoulder sipes 37.

The outside shoulder transverse grooves 30 extend from the outside tread edge Te1 toward the tire equator C. The outside shoulder transverse grooves 30 in this embodiment are first outside shoulder transverse grooves 31 extending from the outside tread edge Te1 to the outside shoulder main groove 5A, and second outside shoulder transverse grooves 32 extending axially inwardly from the outside tread edge Te1 and terminating within the outside shoulder land region 8A.

Although not limited to such arrangement, it is preferred that the first outside shoulder transverse grooves 31 and the second outside shoulder transverse grooves 32 are arranged alternately in the tire circumferential direction. And the second outside shoulder transverse grooves 32 are substantially parallel with major portions of the first outside shoulder transverse grooves 31. Such outside shoulder transverse grooves 31 and 32 can improve the wet performance, while maintaining the rigidity of the outside shoulder land region 8A.

It is preferable that the first outside shoulder transverse groove 31 is provided in its axially inner end portion 31i with a tie bar 38 rising from the groove bottom, and the tie bar 38 is provided in its radially outer surface with a sipe 39 extending in the longitudinal direction of the groove 31. The first outside shoulder transverse grooves 31 configured as such can improve the steering stability and the wet performance in a good balance.

The outside shoulder vertical grooves 33 in this embodiment include two types:

a first outside shoulder vertical groove 34 extending from each of the first outside shoulder transverse grooves 31 to one of the two circumferentially adjacent second outside shoulder transverse grooves 32; and a second outside shoulder vertical groove 35 extending from the above-said each of the first outside shoulder transverse grooves 31 toward the other of the above-said two circumferentially adjacent second outside shoulder transverse grooves 32, and terminated within the outside shoulder land region 8A. Such outside shoulder vertical grooves 34 and 35 can exert excellent drainage performance, while maintaining the rigidity of the outside shoulder land region 8A.

Although not limited to such arrangement, it is preferred that the first outside shoulder vertical grooves 34 and the second outside shoulder vertical grooves 35 are arranged in a straight line in the tire circumferential direction.

The outside shoulder sipes 37 extend substantially parallel with the outside shoulder transverse grooves 30, and terminate without being connected with the outside shoulder vertical grooves 33. Such outside shoulder sipes 37 can maintain the rigidity of the outside shoulder land region 8A to suppress the distortion of the ground contacting surface of the outside shoulder land region 8A.

Figure 6A:
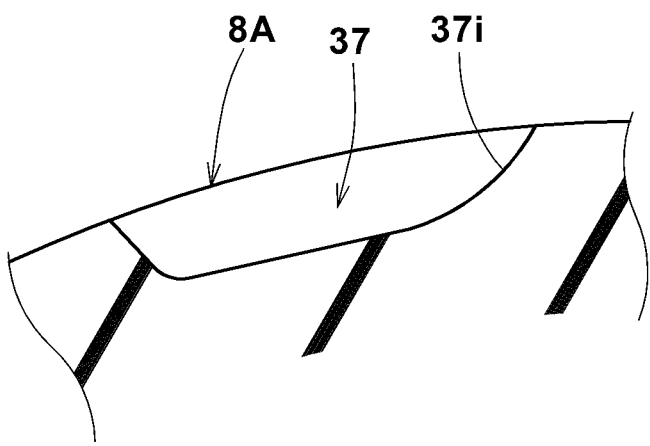
FIG. 6(a) is a cross-sectional view taken along line C-C in FIG. 4.

FIG. 6(a) shows the depth of the outside shoulder sipe 37. As shown, the bottom of the outside shoulder sipe 37 is provided in its axially inner end portion 37i with an arc-shaped profile convexed radially inwardly. Thereby, the rigidity of the axially inner end portion 37i is increased, and excellent steering stability can be obtained.

Figure 5:
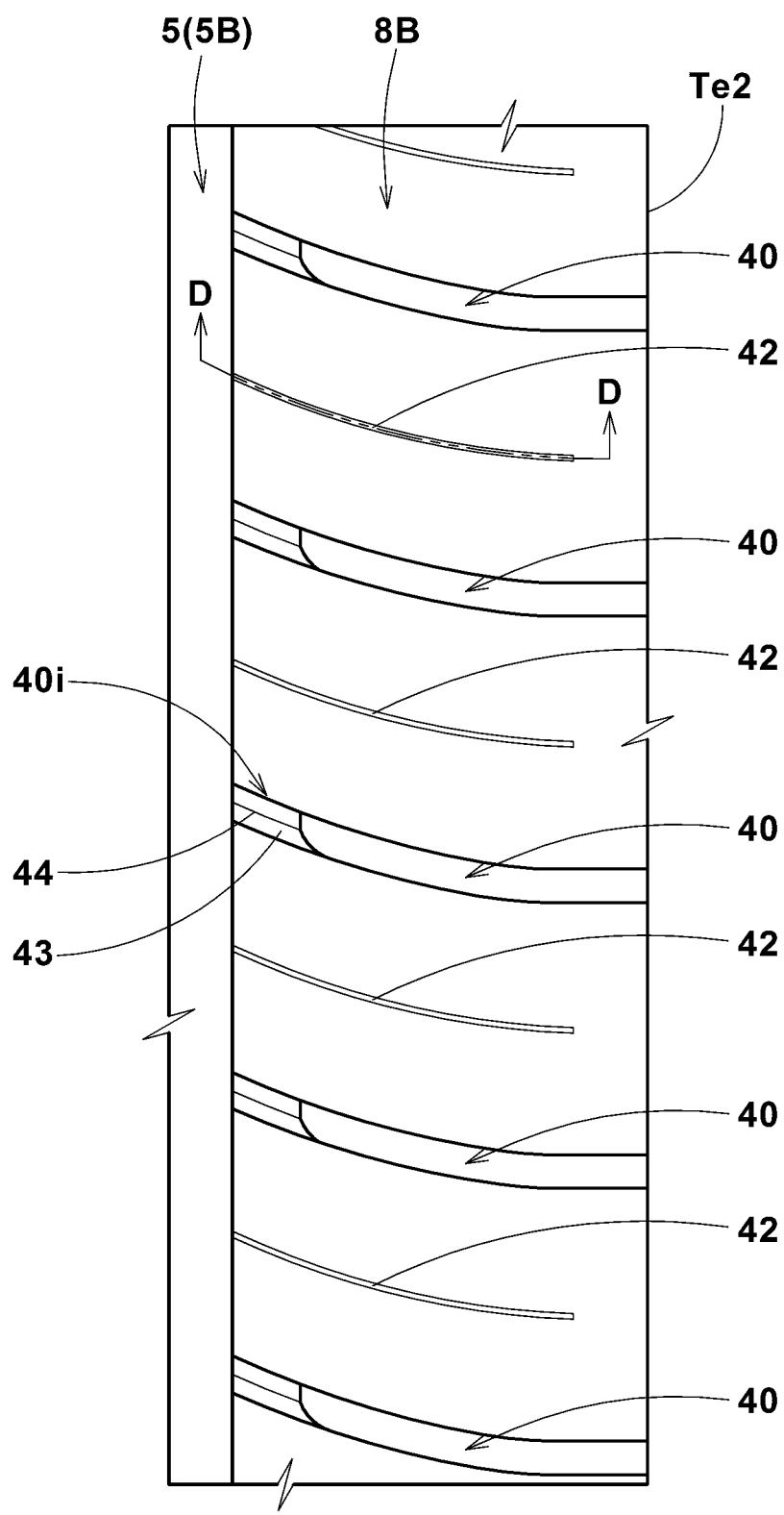
FIG. 5 is a magnified partial view of an inside shoulder land region in FIG. 1.

As shown in FIG. 5, the inside shoulder land region 8B is provided with inside shoulder transverse grooves 40 and inside shoulder sipes 42.

In this embodiment, the inside shoulder transverse grooves 40 extend from the inside tread edge Te2 to the inside shoulder main groove 5B. Preferably, each of the inside shoulder transverse grooves 40 is provided in its axially inner end portion 40i with a tie bar 43 similar to the tie bar 38, and the tie bar 43 is provided in its radially outer surface with a sipe 44 extending in the longitudinal direction of the groove 40.

Each of the inside shoulder sipes 42 has an axially inner end connected with the inside shoulder main grooves 5B, and an axially outer end terminated within the inside shoulder land region 8B without reaching to the inside tread edge Te2. Such inside shoulder sipes 42 can maintain the rigidity of the inside shoulder land region 8B and suppress distortion of the ground contacting surface of the inside shoulder land region 8B.

Figure 6B:
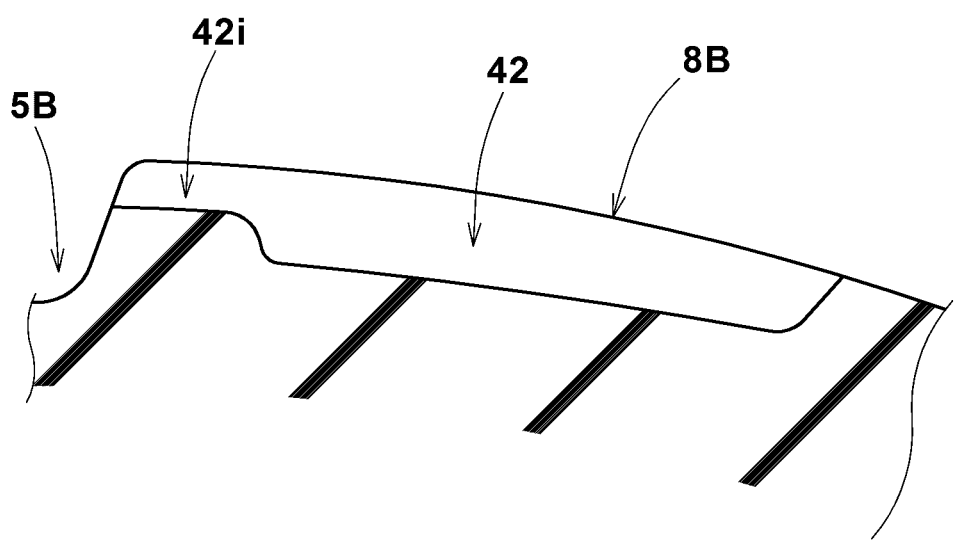
FIG. 6(b) is a cross-sectional view taken along line D-D in FIG. 5.

FIG. 6(b) shows the depth of the inside shoulder sipe 42. As shown, it is preferred that the depth of the inside shoulder sipe 42 is decreased in its axially inner end portion 42i by rising the bottom. Such inside shoulder sipes 42 help to further maintain the rigidity of the inside shoulder land region 8B, therefore, it is possible that the steering stability is further improved.

While detailed description has been made of the pneumatic tire as an embodiment of the present invention, the present invention can be embodied in various forms without being limited to the illustrated embodiment.

Comparison Tests

Based on the tread pattern shown in FIG. 1, pneumatic tires of size 205/60R16 (Rim size 16×6J) were experimentally manufactured as test tires (working examples Ex1-Ex13 and comparative examples Ref1-Ref2).

Specifications of the test tires are listed in Table 1. otherwise the test tires had the same specifications, for example:

the width W3 of the outside middle land region:
15.2% of the tread width TW
the maximum depth d1 in the first oblique segment:
5.1 mm.

The test tires were tested for the steering stability and wet performance by the use of a test car, 1400 cc front-wheel-drive passenger car all wheels of which were mounted with test tires inflated to 230 kPa.

<Steering Stability Test>

During the test car was run on an asphalt road surface of a circuit course, the test driver evaluated the steering stability. The results are indicated in Table 1 by an evaluation point based on the comparative example Ref1 being 100, wherein the larger the numeric value is, the better the steering stability is.

<Wet Performance Test>

The test car was run along a 100 meter radius circle on an asphalt road partially provided with a 5 mm depth 20 m long water pool, and the lateral acceleration (lateral G) during running in the water pool was measured at the front wheels, gradually increasing the speed entering into the water pool, to obtain the average for the speed range from 50 to 80 km/h.

The results are indicated in Table 1 by an index based on the comparative example Ref1 being 100, wherein the larger the numeric value is, the better the wet performance is.

TABLE 1

| Tire | Ref 1 | Ref 2 | Ex 1 | Ex 2 | Ex 3 | Ex 4 | Ex 5 | Ex 6 |
|---|---|---|---|---|---|---|---|---|
| Maximum depth d2/Maximum depth d1 | 1.00 | 0.40 | 0.40 | 0.30 | 0.35 | 0.50 | 0.60 | 0.40 |
| Distance L1/Width W3 | 0.65 | 0.35 | 0.65 | 0.65 | 0.65 | 0.65 | 0.65 | 0.55 |
| Angle θ3 (deg.) | 140 | 140 | 140 | 140 | 140 | 140 | 140 | 140 |
| Steering stability | 100 | 99 | 107 | 110 | 108 | 107 | 105 | 105 |
| Wet performance | 100 | 102 | 103 | 99 | 100 | 103 | 104 | 103 |

| Tire | Ex 7 | Ex 8 | Ex 9 | Ex 10 | Ex 11 | Ex 12 | Ex 13 |
|---|---|---|---|---|---|---|---|
| Maximum depth d2/Maximum depth d1 | 0.40 | 0.40 | 0.40 | 0.40 | 0.40 | 0.40 | 0.40 |
| Distance L1/Width W3 | 0.60 | 0.70 | 0.75 | 0.65 | 0.65 | 0.65 | 0.65 |
| Angle θ3 (deg.) | 140 | 140 | 140 | 130 | 135 | 145 | 150 |
| Steering stability | 106 | 107 | 107 | 107 | 107 | 106 | 105 |
| Wet performance | 103 | 103 | 101 | 101 | 103 | 103 | 103 |

From the test results, it was confirmed that the pneumatic tires as the working examples were improved in the steering stability without sacrificing the wet performance.

REFERENCE SIGNS LIST 2 tread portion
4A outside land region
10 first sipe
11 first oblique segment
12 second oblique segment
13 v-shaped portion
15 apex
d1 maximum depth in first oblique segment
d2 maximum depth in second oblique segment
Te1 outside tread edge
Te2 inside tread edge

The invention claimed is:

1. A pneumatic tire comprising
a tread portion having a position that when mounted on a vehicle is specified so that the tread portion has an outside tread edge located toward the outside of the vehicle and an inside tread edge located toward the inside of the vehicle,
the tread portion being provided with an outside land region disposed on the outside-tread-edge side of the tire equator and an inside land region disposed on the inside-tread-edge side of the tire equator,
the outside land region being provided with first sipes each extending across the entire width of the outside land region and each comprising a V-shaped portion, and
the inside land region being provided with second sipes each extending straight across the entire width of the inside land region,
wherein
the V-shaped portion is formed by a first oblique segment and a second oblique segment connected with each other at an apex of the V-shaped portion,
the apex is located on the outside-tread-edge side of a widthwise center of the outside land region,
the first oblique segment and the second oblique segment are located on the inside-tread-edge side and the outside-tread-edge side of the apex, respectively,
the first oblique segment has a maximum depth and the second oblique segment has a maximum depth smaller than the maximum depth of the first oblique segment, and
the second sipes are inclined to the same direction as the first oblique segments of the first sipes.

2. The pneumatic tire according to claim 1, wherein each of the first sipes is provided with a transitional portion in which the depth of the first sipe is changed and which is positioned so as not to include the apex.

3. The pneumatic tire according to claim 2, wherein the transitional portion is positioned on the inside-tread-edge side of the apex.

4. The pneumatic tire according to claim 1, wherein the depth of the first oblique segment measured at its end portion on the inside-tread-edge side, is smaller than said maximum depth of the first oblique segment.

5. The pneumatic tire according to claim 1, wherein the second sipes have their ends on the inside-tread-edge side which are respectively connected with wider slot-like depressions formed at the edge on the inside-tread-edge side, of the inside land region.

6. The pneumatic tire according to claim 1, wherein each of the second sipes comprises
a first portion in which the maximum depth of the second sipe occurs,
a second portion which is disposed on the outside-tread-edge side of the first portion, and of which maximum depth is smaller than said maximum depth in the first portion, and
a third portion which is disposed on the inside-tread-edge side of the first portion and of which maximum depth is smaller than said maximum depth in the first portion, and
the second portion has an axial dimension and the third portion has an axial dimension smaller than the axial dimension of the second portion.

7. The pneumatic tire according to claim 6, wherein in said first portion, the depth of the second sipe is gradually decreased toward the inside tread edge.

8. The pneumatic tire according to claim 1, wherein the second oblique segment of said V-shaped portion has a flat bottom extending at a constant depth.

9. The pneumatic tire according to claim 1, wherein
an angle of said first oblique segment with respect to the tire axial direction is not less than 25 degrees and not greater than 35 degrees,
an angle of said second oblique segment with respect to the tire axial direction is not less than 5 degrees and not greater than 15 degrees, and
an angle between the first oblique segment and the second oblique segment is not less than 130 degrees and not greater than 150 degrees.

10. The pneumatic tire according to claim 1, wherein,
the tread portion is provided with circumferentially continuously extending main grooves including a center main groove, an outside shoulder main groove on the outside tread edge side of the center main groove, and an inside shoulder main groove on the inside tread edge side of the center main groove, and
a groove width of each of the main grooves is not less than 3.5% and not greater than 10.0% of a tread width between the outside tread edge and the inside tread edge.

11. The pneumatic tire according to claim 10, wherein the total of the groove widths of the main grooves is not less than 23% of the tread width.

12. The pneumatic tire according to claim 10, wherein the groove width of the center main groove is larger than the groove width of the shoulder main grooves.

13. The pneumatic tire according to claim 10, wherein a groove depth of each of the main groove is not less than 5.0 mm and not greater than 12.0 mm.

14. The pneumatic tire according to claim 10, wherein the tread portion comprises:
an outside shoulder land region between the outside shoulder main groove and the outside tread edge, and
an outside middle land region between the outside shoulder main groove and the center main groove, and
the outside middle land region is said outside land region provided with the first sipes.

15. The pneumatic tire according to claim 14, wherein the outside shoulder land region is provided with first outside shoulder transverse grooves each extending from the outside tread edge to the outside shoulder main groove and each provided in its axially inner end portion with a siped tie bar rising from the groove bottom.

16. The pneumatic tire according to claim 15, wherein
the outside shoulder land region is provided with second outside shoulder transverse grooves alternately with the first outside shoulder transverse grooves,
the outside shoulder land region is further provided with a first outside shoulder vertical groove extending from each of the first outside shoulder transverse grooves to one of the two circumferentially adjacent second outside shoulder transverse grooves, and
a second outside shoulder vertical groove extending from said each of the first outside shoulder transverse grooves toward the other of said two circumferentially adjacent second outside shoulder transverse grooves, and terminated within the outside shoulder land region.

17. A pneumatic tire comprising:
a tread portion having a position that when mounted on a vehicle is specified so that the tread portion has an outside tread edge located toward the outside of the vehicle and an inside tread edge located toward the inside of the vehicle;
the tread portion being provided with an outside land region disposed on the outside-tread-edge side of the tire equator and an inside land region disposed on the inside-tread-edge side of the tire equator;
the outside land region being provided with first sipes each extending across the entire width of the outside land region and each comprising a V-shaped portion; and
the inside land region provided with second sipes each extending straight across the entire width of the inside land region,
wherein
the V-shaped portion is formed by a first oblique segment and a second oblique segment connected with each other at an apex of the V-shaped portion,
the apex is located on the outside-tread-edge side of a widthwise center of the outside land region, and
the first oblique segment and the second oblique segment are located on the inside-tread-edge side and the outside-tread-edge side of the apex, respectively; and
the second sipes are inclined to the same direction as the first oblique segments of the first sipes.

* * * * *